(12) United States Patent
Suzuki

(10) Patent No.: US 9,731,260 B2
(45) Date of Patent: Aug. 15, 2017

(54) MEANS FOR MANUFACTURING MICRO-BEADS COMPRISING THERMOPLASTIC POLYMER MICRO-PARTICLES

(75) Inventor: Akihiro Suzuki, Yamanashi (JP)

(73) Assignee: University of Yamanashi, Yamanashi (JP)

( * ) Notice: Subject to any disclaimer, the term of this patent is extended or adjusted under 35 U.S.C. 154(b) by 544 days.

(21) Appl. No.: 14/239,029

(22) PCT Filed: Jul. 24, 2012

(86) PCT No.: PCT/JP2012/068647
§ 371 (c)(1),
(2), (4) Date: Apr. 29, 2014

(87) PCT Pub. No.: WO2013/024669
PCT Pub. Date: Feb. 21, 2013

(65) Prior Publication Data
US 2014/0234625 A1    Aug. 21, 2014

(30) Foreign Application Priority Data
Aug. 15, 2011    (JP) .................................. 2011-177370

(51) Int. Cl.
*B29B 9/10*    (2006.01)
*B01J 2/04*    (2006.01)
(Continued)

(52) U.S. Cl.
CPC    *B01J 2/04* (2013.01); *B29B 9/10* (2013.01); *B29B 9/06* (2013.01);
(Continued)

(58) Field of Classification Search
CPC ..... B01J 2/04; B29B 9/10; B29B 9/06; B29B 2009/125; Y10T 428/2982; B29C 35/045;
(Continued)

(56) References Cited

U.S. PATENT DOCUMENTS 3,345,235 A * 10/1967 Miller .................. B29B 9/00
156/298
4,078,165 A * 3/1978 Tuttle .................. B23K 26/04
219/121.67
(Continued)

FOREIGN PATENT DOCUMENTS

EP    1920825    5/2008
EP    2103723    9/2009
(Continued)

OTHER PUBLICATIONS

Supplementary European Search Report corresponding to European Patent Application No. 12823324.1-1706 I 2732945 dated Feb. 24, 2015.
(Continued)

*Primary Examiner* — Galen Hauth
(74) *Attorney, Agent, or Firm* — Jenkins, Wilson, Taylor & Hunt, P.A.

(57) ABSTRACT

The present invention relates to means for manufacturing micro-beads (polymer micro-particles) comprising thermoplastic polymer and having the average particle size of 10 μm or less, and extending into the nano-range. An original filament comprising a thermoplastic polymer is passed through an orifice under an air pressure (P1) and guided to a spray chamber under a pressure (P2; where P1>P2). The original filament having passed through the orifice is heated and melted under irradiation by an infrared beam, and is sprayed in microparticulate form from the orifice by the flow of air generated by the pressure differential between P1 to P2, whereby micro-beads comprising thermoplastic polymer micro-particles having an average particle size of 10 μm or less, and even less than 1 μm are manufactured.

10 Claims, 13 Drawing Sheets

(51) Int. Cl.
  *B29C 35/08* (2006.01)
  *B29B 9/12* (2006.01)
  *B29B 9/06* (2006.01)
  *B29C 35/04* (2006.01)

(52) U.S. Cl.
  CPC ....... *B29B 2009/125* (2013.01); *B29C 35/045* (2013.01); *B29C 2035/0811* (2013.01); *B29C 2035/0822* (2013.01); *B29C 2035/0838* (2013.01); *Y10T 428/2982* (2015.01)

(58) Field of Classification Search
  CPC ..... B29C 2035/0838; B29C 2035/0811; B29C 2035/0822
  See application file for complete search history.

(56) References Cited

U.S. PATENT DOCUMENTS

| | | | |
|---|---|---|---|
| 4,600,375 A * | 7/1986 | Honsho | B29C 45/462 425/174.4 |
| 6,171,433 B1 * | 1/2001 | Otaigbe | B01J 2/04 156/272.2 |
| 8,057,730 B2 | 11/2011 | Suzuki | |
| 2004/0118007 A1 * | 6/2004 | Chickering, III | A61K 9/1647 34/360 |
| 2004/0220318 A1 | 11/2004 | Lepkowski | |
| 2006/0006585 A1 | 1/2006 | Suzuki | |
| 2006/0182960 A1 | 8/2006 | Suzuki | |
| 2008/0122132 A1 | 5/2008 | Kinoshita et al. | |
| 2008/0182114 A1 * | 7/2008 | Kim | C23C 4/04 428/469 |
| 2009/0056620 A1 * | 3/2009 | Oda | B05B 12/084 118/300 |
| 2010/0148406 A1 | 6/2010 | Suzuki | |
| 2010/0196228 A1 | 8/2010 | Efird | |

FOREIGN PATENT DOCUMENTS

| | | |
|---|---|---|
| JP | 62-197424 | 9/1987 |
| JP | 2-229561 | 9/1990 |
| JP | 5-70598 | 3/1993 |
| JP | 5-179005 | 7/1993 |
| JP | 11-12498 | 1/1999 |
| JP | 2008-43944 | 2/2008 |
| JP | 2008-137377 | 6/2008 |
| JP | 2008-169275 | 7/2008 |
| JP | 2010 144055 | 7/2010 |
| JP | 2010 196228 | 9/2010 |
| JP | 2011-177370 | 8/2011 |
| WO | WO 2008/084797 | 7/2008 |

OTHER PUBLICATIONS

International Search Report corresponding to International Application No. PCT/JP2012/068647 dated Oct. 9, 2012. (Translation).

* cited by examiner (A)

(B)

ns for micro-beads (polymer micro-particles) comprising thermoplastic polymer micro-particles. More specifically, the present invention relates to manufacturing means for micro-beads with an average particle size that is 10 μm or smaller and also further into the nano region by fusing a thermoplastic filament using an infrared beam and spraying the polymer using a high speed gas flow.

MEANS FOR MANUFACTURING MICRO-BEADS COMPRISING THERMOPLASTIC POLYMER MICRO-PARTICLES

FIELD OF THE INVENTION

The present invention relates to manufacturing means for micro-beads (polymer micro-particles) comprising thermoplastic polymer micro-particles. More specifically, the present invention relates to manufacturing means for micro-beads with an average particle size that is 10 μm or smaller and also further into the nano region by fusing a thermoplastic filament using an infrared beam and spraying the polymer using a high speed gas flow.

BACKGROUND OF THE INVENTION

Polymer micro-particles in the recent years have been used to modify polymers, as additives in cosmetics and pharmaceutical agents, and as rheology modifying agents in paint and the like since the particle size is small, surface area is very large and the dispersion properties in other substances are good. Polymer micro-particles attracted attention particularly as starting materials for resin molding technology such as rapid prototyping wherein custom made molded products are manufactured by combining the polymer micro-particles with laser processing technology.

Micro-beads manufacturing processes can be roughly divided into two types. One process is the built up method wherein micro-beads of a set size are formed from small shapes or shapeless solutions and the like. A typical example is a method in which micro-beads are formed using polymerization steps such as emulsion polymerization and suspension polymerization. In addition, processes such as spray dry methods and atomizing (sprays) methods (for example, the one disclosed in JP 2008-169275) may also be used. Such processes use solvents and additives, and complete removal of such solvents and the like from the micro-beads formed is difficult to achieve. In addition, only the polymers that are suited to such polymerization processes, solvents and the like can be used, and the usable polymer itself is limited.

The other process is the breakdown method wherein micro-beads of set size are formed from large shapes, typically using a grinding process. The grinding process is used to form microparticles by combining a compression shear type mill, roller mill and the like and a sorting device. However, the process has problems. For example, the polymer that can be used is restricted, the micro-particle formation efficiency is poor for the enormous amount of mechanical energy consumed and only micro-particles with poor sphericity are formed.

The present invention is a means to produce micro-beads having an average particle size of from several microns to nanometers using filaments with a set diameter (for example, from 100 μm to 200 μm). Therefore, the micro-beads manufacturing means of the present invention is one type of breakdown method and presents a completely new means previously unknown. A filament drawing technology using infrared beams was disclosed in a previous patent application filed by the present inventors (International Disclosure Publication WO2008/084797A1). The present invention further develops the technology of the previous invention and presents a means to effectively form micro-beads comprising thermoplastic polymer micro-particles.

CROSS REFERENCES TO RELATED APPLICATIONS

[Patent Document 1] JP2008-169275 (Pages 1-2).
[Patent Document 2] International Publication WO2008/084797A1 (Pages 1-2, FIG. 1)

SUMMARY OF THE INVENTION

Problems to be Solved by the Invention

The present invention further develops the previous invention of the inventors, and the objective is to make it possible to manufacture micro-beads from all thermoplastic polymers. In addition, the present invention also presents means to consistently manufacture micro-beads with good productivity without using solvents and additives. Furthermore, the micro-beads formed using the present invention have the characteristic of having uniform particle size, and the micro-particles formed are highly spherical.

Means to Solve the Problems

The present invention relates to manufacturing means for micro-beads comprising thermoplastic polymer micro-particles. Thermoplastic polymers are polymers that are plasticized by heat, and examples are shown below. Filaments comprising a thermopolymer such as poly(ethylene terephthalate), polyesters including aliphatic polyesters and poly(ethylene naphthalate), polyamides such as nylon (for example, nylon 6, nylon 66, nylon 11, nylon 12 and the like), polyolefins including polypropylene and polyethylene, poly(vinyl alcohol) type polymers, acrylonitrile type polymers, fluorinated polymers including tetrafluoroethylene•perfluoroalkyl vinyl ether copolymers (PFA) and the like, vinyl chloride type polymers, styrene type polymers, polyoxymethylene and ether ester type polymers may be used. In addition, biodegradable polymers such as poly(lactic acid), poly(glycolic acid) and the like, polymers that are decomposed and absorbed in vivo and the like may also be used. Now, the filament needs to be described as a polyester "type" or containing polyester as the "major component" when the polymer described above is present in at least 85% (% by weight).

The micro-beads of the present invention are referred to as polymer micro-particles and are also referred to as nano particles when the particle size is smaller than 1 μm. The micro-beads of the present invention have an average particle size that is 10 μm or smaller, and the characteristic of the present invention is that particles with an average particle size smaller than 1 μm, that is nano particles, can be produced easily. The average particle size is a arithmetic average calculated by counting one hundred particles (sometimes more when the electron microscope used is equipped with length measuring software) using an electron microscope under the magnification of several thousand to several tens of thousands. In addition, micro-beads of the present invention have narrow particle size distributions, and one of the characteristics is that the particles are highly spherical. As far as the particle size distribution is concerned, the standard deviation was calculated using the individual particle size measured in the manner described above and using it as a measure of the particle size distribution. The standard deviation of the particle size distribution of micro-beads in the present invention is 0.2 or lower, but 0.1 or lower is preferred. A narrower particle size distribution signifies that less sorting is needed when micro-beads are used in applications wherein a particle size within a set range is required. In addition, the narrower particle size also means a higher yield of a product.

In addition, micro-beads of the present invention are characterized by excellent sphericity. The sphericity of a particle is the extent to which individual particles are deformed from a true sphere and is conveniently represented by the ratio b/a of the long diameter (a) and the short diameter (b) of a particle. The average sphericity is indicated by the arithmetic average of individual measurements. An average sphericity of micro-beads in the present invention of at least 0.8 is desired, and at least 0.9 is more desirable.

In ordinary direct spinning of non-woven fabrics such as spun-bonded non-woven fabric, melt-blown non-woven fabric and the like, grains and particles referred to as shots, balls and lumps are present but should be distinguished from micro-beads. So called shots frequently have diameters in excess of several tens of microns, and the diameter is several times the filament diameter constructing the non-woven fabric. The shots diameter is ordinarily at least ten times the filament diameter, and the number of filaments is overwhelmingly greater than the number of shots. The shots are viewed as defects in a non-woven fabric. The micro-particles of the present invention are characterized by the uniform particle size. At this point, the micro-beads differ from shots and lumps in spun-bonded fabric or melt-blown non-woven fabric.

In micro-bead manufacturing means of the present invention, filaments are sometimes formed as a by-product apart from micro-beads. The average particle size of the micro-beads of the present invention is characteristically either comparable to or smaller than the average filament diameter of the filament formed as a by-product. In addition, the number of micro-beads formed is overwhelmingly greater than the filament count.

The micro-beads manufacturing means of the present invention is an application of the super high multiple drawing means that utilized a carbon dioxide gas laser beam and the pressure difference between before and after an orifice as described in the International Patent Publication WO2008/084797A1, the previous invention application of the inventors, to thermoplastic polymer micro-beads manufacturing means. Original filament comprising a thermoplastic polymer with filament diameters of from several tens of microns to several hundreds of microns are heated and melted using a laser beam, and the molten polymer is ejected utilizing the pressure difference before and after an orifice to provide a high speed gas spray to form micro-beads. The original filaments comprising a thermoplastic polymer refer to filaments that have already been produced and wound on reels and the like. In addition, a filament obtained in a spinning process due to cooling or coagulation of molten or fused filaments may be used in a spinning process without delay and be used as the original filament in the present invention. Here a filament refers to a basically continuous filament and is distinguished from staple fibers several millimeters to several tens of millimeters long. The original filament is preferably used individually, but several filaments may also be used collectively.

In the present invention an original filament with a high degree of crystallinity is preferred and is heat treated preferably at the optimum heat treatment temperature of the polymer constituting the original filament. In addition, not only the heat treatment but also oriented crystallization resulting from orientation may also be used. A degree of crystallinity, as measured using a differential scanning calorimeter (DSC), of at least 25% is preferred, at least 35% is more preferred and at least 40% is most preferred. The value differs with the polymer type. Experimental results confirmed that a high degree of crystallization was associated with a high probability of the infrared beam heated filament being transformed into micro-beads rather than microfilaments. The differential scanning calorimeter (DSC) measurements of original filaments were obtained using the heat flow bundle DSC of JIS K 0129. About 2 mg of the original filament was accurately weighed into a lidded aluminum pan, and measurements were taken using alumina as the standard sample at a temperature increase rate of 10° C./min.

The original filament that is transferred using a filament transfer out means is led into an orifice. Various types of transfer out means may be used as long as the filament can be transferred out at an almost constant transfer out rate. For example, a combination of nip rollers and several stages of driving rollers or rotating reels may be used.

In the means in which the original filament is introduced to an orifice, a step in which the original filament is heat treated may be present. Experimental results indicated that original filaments with high degrees of crystallinity are better suited for conversions into micro-beads. Therefore, the original filament is preferably heat treated prior to introduction to the orifice or in the process of being introduced to the orifice. The heat treatment incorporated into the process when compared to a separate heat treatment step does not add a separate step for the heat treatment and can reduce the number of steps by one. Furthermore, a heat treatment that is incorporated into the process prevents damage and denaturation due to repeated releasing and winding of undrawn original filaments that are difficult to handle and makes a stable microbead formation process possible. The heat treatment may be conducted prior to the introduction of the original filament to the orifice or during the process by allowing the original filament to pass through a hot air zone or by using infrared beam or hot plate heating. Now, the heat treatment temperature is preferably at least the softening point of the polymer constituting the original filament and at or below the melting point.

An original filament comprising a thermoplastic polymer is transferred out using a transfer out means at P1 pressure and is introduced through an orifice to a spray chamber under P2 pressure (P1>P2). The original filament that passed through the orifice is heated and melted using infrared beam irradiation and is sprayed using the gas flow generated by the P1 and P2 pressure difference. Now, letting the pressure P1 be atmospheric pressure when a filament is transferred out and the spray chamber pressure P2 be a reduced pressure is a preferred mode since such a device can be conveniently obtained. In addition, one of the preferred modes is to have P1 under added pressure and P2 under reduced pressure since the degree of reduced pressure does not need to be as great to achieve a greater pressure differential between P1 and P2.

Room temperature air is ordinarily used as the gas generating P1 and P2. However, heated air may also be used when the original filament is pre-heated or heat treated. In addition, steam or air containing steam is used when humidity needs to be supplied to the original filament. Furthermore, an inert gas such as nitrogen is used to prevent oxidation of the original filament.

The original filament supply chamber and the spray chamber are connected by the orifice in the present invention. A high speed gas flow is generated inside the orifice by the P1>P2 pressure differential in the narrow gap between the original filament and the orifice inside diameter. The orifice inside diameter D and the filament diameter d cannot be too different in order to generate the high speed gas flow. Based on the experimental results, the pressure differential should be obtained with D>d with D<30d, preferably D<10d, more preferably D<5d and most preferably D>2d.

The orifice inner diameter D refers to the diameter of the orifice exit. However, the narrowest section of the orifice is assigned the diameter D when the orifice cross section is not circular. Similarly, the smaller diameter d is used as the filament diameter when the filament cross section is not circular. The smaller diameter d represents an arithmetic average of ten locations using as the standard where the cross section is the smallest. In addition, a shape in which the inner orifice diameter is not uniform but is tapered to narrow toward the exit is preferred. Now an original filament ordinarily passes from top to bottom through an orifice exit, and the lower end of the vertically positioned orifice is considered the exit. When an original filament passes from the bottom to the top, the upper end of the orifice becomes the exit. Similarly, an exit is located horizontally when the orifice is positioned horizontally and an original filament moves horizontally.

An orifice interior with low structural resistance is preferred since a high speed gas flow is created inside an orifice in the manner described above. As far as the orifice shape in the present invention is concerned, individually independent orifices may be used, but multiple openings may also be created on a plate to prepare a multi-port orifice. A circular cross section is preferred for the orifice interior, but oblong and rectangular cross sections may also be used when multiple filaments pass through or the filament shape is oblong or tapered. In addition, an orifice entrance that is large to facilitate easy insertion of an original filament with only the exit section being narrow is preferred since such a shape reduces the filament running resistance and delivers a high wind speed from the orifice exit.

The orifice in the present invention plays a different role than previously described wind transfer pipes mentioned by the inventors and the like. The previously described wind transfer pipe that used in no pressure difference between P1 and P2 functioned to allow pressurized gas from outside to enter and to focus a laser on a set position on a filament. Therefore, the role was to transfer an original filament to a set location with as little resistance as possible. The present invention differs in the point that the orifice adds a natural countercurrent generated by the high speed gas flow created by the pressure difference between the pressure P1 of the original filament supply chamber and the pressure P2 of the spray chamber. Now, a molten filament is under tension through an air sucker and the like in an ordinary spun bond non-woven fabric production process. However, the air sucker in a spun-bonded non-woven cloth manufacturing process and the orifice in the present invention have completely different action mechanisms and advantages. A molten filament in a spun-bonded process is transferred by the high speed fluid inside an air sucker, and filament diameter thinning is almost completely finished inside the air sucker. In contrast, a solid original filament is transferred by the orifice in the present invention, and the filament thinning does not start inside the orifice. The drawing is initiated for the first time when the filament is irradiated by a laser beam upon exiting the orifice. In addition, a high speed fluid flow is generated in a spun-bonded process by sending high pressure air to the interior of an air evacuator. The present invention differs in the point that a high speed fluid flow is generated inside the orifice by the pressure difference in the chambers before and after the orifice. In addition, the effects are also different. In a spun-bonded process, the filament diameter obtained is limited to under and over 10 μm at most. However, micro-beads are formed in the present invention, and, in some cases, micro-beads and filaments ranging from several microns to less than 1 μm are obtained.

The original filament of the present invention is heated and melted upon irradiation with an infrared heating means (includes laser) using an infrared light beam (a light bundle). The infrared light beam irradiation of the present invention may be conducted from multiple locations. A large amount of heating energy needs to be concentrated at one point to form micro-beads. In addition, obtaining micro-beads with uniform particle size and good sphericity is sometimes difficult when an original filament is heated from one side only using asymmetric heating. Such multiple site irradiations can be achieved by using mirrors to reflect an infrared light beam and irradiate an original filament multiple times along the original filament passage. As far as the mirrors are concerned, not only a stationary type but also rotating mirrors such as polygon mirrors may be used. In addition, another means of irradiating a filament from multiple locations is a means to irradiate an original filament using multiple light sources. A high powered light source can be created using multiple stable and inexpensive laser oscillation devices as relatively small scale laser light sources. The use of such multiple light sources is effective since high watt density is needed to form micro-beads of the present invention.

The infrared radiation is defined as wavelengths of from 0.78 μm to 1 mm. The polymer compound absorption for the C—C bond is centered at 3.5 μm. The near infrared region range of from 0.78 μm to 20 μm is particularly preferred. The infrared radiation is used in the form of a light beam, and a mirror or a lens is used to focus linearly or on a point. A heater referred to as a spot heater or a line heater that narrows the heated zone in an original filament to the center of a filament from 4 mm up or 4 mm down may be used. A line heater is particularly ideal when multiple original filaments are moving in parallel and they are to be heated simultaneously.

A laser beam is particularly preferred as the heat source for the infrared beam heating of the present invention. Of these, carbon dioxide gas lasers with a wavelength of 10.6 μm and YAG (yttrium, aluminum and garnet type) lasers with a wavelength of 1.06 μm are particularly preferred. In addition, argon lasers may also be used. A laser can focus on a small radiation zone. In addition, a laser can concentrate on a specific wavelength and waste little energy.

The original filament released from the orifice is heated and melted at the orifice exit using an infrared beam. Experimental results indicated that the center of the infrared beam should be directly under the orifice, meaning 30 mm or less, preferably 10 mm or less and most preferably 5 mm or less from the orifice tip. The original filament swings after leaving the orifice and does not remain in a set position. Therefore, the filament cannot be consistently captured by the infrared beam. In addition, the force of the high speed gas from the orifice experienced by the filament weakens as the filament distances itself from the orifice, and the stability declines.

The original filament of the present invention is heated and melted by the infrared beam. The heated zone at this point is preferably in the center within 4 mm up and down (8 mm length) along the filament axis direction, but 3 mm up and down or less is preferred and 2 mm up and down or less is most preferred. The beam diameter is measured along the axis direction of the moving filament. The means of the present invention achieves extensive miniaturization and very micro-particles in the nano region are formed by suddenly spraying into a narrow area. Now, the filament center refers to a filament bundle center when exposing a multifilament type filament to infrared beam irradiation.

The micro-particles (micro-beads) sprayed using the high speed fluid generated by the pressure differential between P1 and P2 scatter inside a spray chamber under constant pressure (P2). A micro-particle accumulation chamber is sometimes installed in the bottom of the spray chamber, but the accumulation chamber is included in the spray chamber in a broad definition since the accumulation and spray chambers are under the same pressure. A collection vessel may be installed inside the spray chamber and the micro-particles can be collected directly.

The micro-particles that are sprayed may be accompanied with drawn filaments in some cases that are formed as a by-product along with the micro-particles. The drawn filaments are stretched by the elongation tension generated by the gas flow ejected from the orifice. The present invention presents micro-particle manufacturing means, and drawn filaments are truly by-products. Therefore, the number of filaments is overwhelmingly smaller than the number of micro-particles and is not more than one per several tens and is ordinarily smaller than one per several hundreds. In addition, the diameter of the filament drawn is not more than one per several tens of the original filament but is ordinarily smaller than one per several hundreds.

The micro-particles (micro-beads) sprayed in the present invention or the drawn filament formed as a by-product along with the micro-particles may be accumulated on a conveyer by installing a conveyer in the spray chamber for the micro-particles sprayed and the like. The micro-particles and the like accumulated on the conveyer can be gathered in a collection vessel after separating them using a scraper.

The micro-particles and the like sprayed in the present invention can be accumulated inside the spray chamber using a filter. The filter may play a role of separating micro-particles and drawn filaments from air in some cases and may play a role of separating the micro-particles from the drawn filaments in some cases. When separating micro-particles and the like from air, a filter that is as dense as possible such as, for example, a filter that is at least 50 mesh with less than a 40% opening ratio is preferred. In addition, when separating micro-particles from drawn filaments, a filter that is less than 40 mesh is used and less than 30 mesh is desirable. A filter with at least a 40% open ratio, preferably at least a 50% open ratio is desirable. The micro-beads and the like that are filtered are accumulated inside the spray chamber.

The filtration effect for the aforementioned drawn filaments formed as a byproduct can be enhanced by installing a vibrator on the filter. In addition, the filter is preferably moved circularly to form a conveyer and continuously filter the micro-beads. The drawn filaments accumulated on the conveyer are wound on a separately installed winding device. The separation efficiency for the micro-beads from the drawn filaments may be enhanced by installing a vibrator on the filter.

The micro-beads accumulated on the conveyer or the micro-beads accumulated in a spray chamber are preferably subjected to a heat treatment. The heat treatment is conducted using hot air circulation, infrared beam heating or by passing the micro-beads over rollers and plates heated using induction heating and the like. A heating temperature of at least the micro-beads softening point and at or below the melting point is desirable.

Advantages of the Invention

The present invention is characterized by the ability to produce micro-beads from all thermoplastic polymers. The conventional built up process uses solvents and additives, but the process of the present invention can produce micro-beads without using them at all. In addition, the conventional break down process has poor production efficiency for a process that uses a large amount of mechanical energy, and, in addition, there are restrictions on the polymer hardness, softening point and the like. The present invention imposes no restrictions on hardness, softening point and the like, and one of the characteristics is the applicability to all thermoplastic polymers. In addition, the micro-beads formed by the present invention are characterized by even particle sizes and the formation of highly spherical micro-particles. In addition, the production process is characterized by a single step, convenience and high productivity while the production method is inexpensive. Furthermore, the present invention is conducted in a sealed chamber in a closed system and is characterized by the prevention of the diffusion of the nano particles obtained into the atmosphere. That means that one of the characteristics of the present invention is a safer working environment.

The micro-beads of the present invention are ideal for use in biomedical, cosmetic and pharmaceutical development fields since no solvents and additives are used. In addition, the micro-beads of the present invention have an even particle size and are highly spherical, making them ideal as a starting material in rapid prototyping resin molding technology methods. The present invention offers the ability to present various polymer particles in a field where nylon 11 that used in molding technology such as rapid prototyping.

EMBODIMENT OF THE INVENTION

Figure 1:
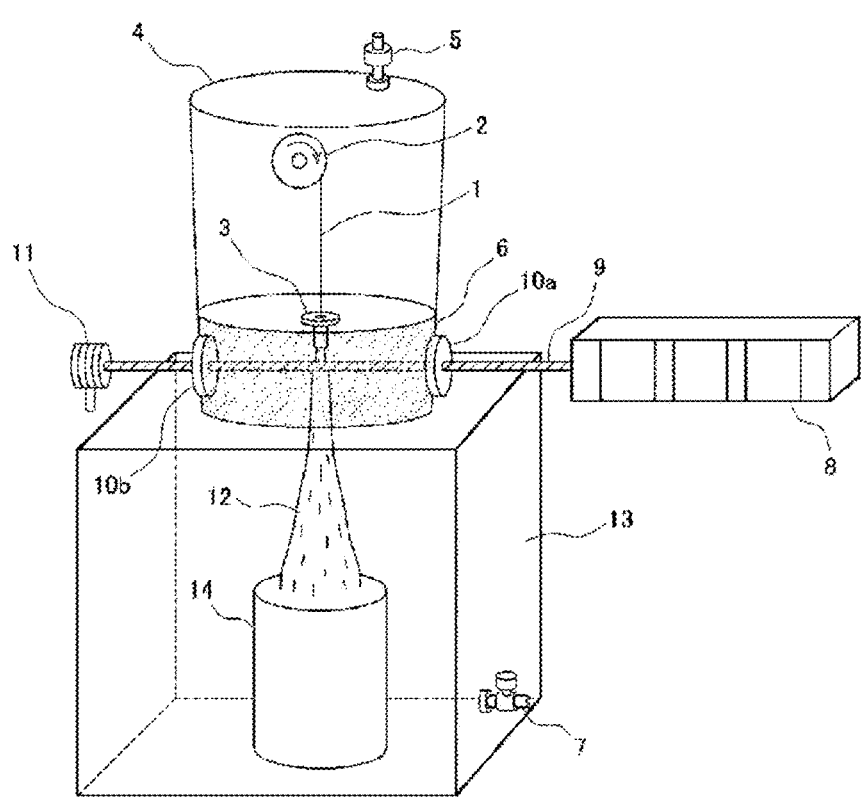
FIG. 1 The figure is a conceptual diagram of a device that describes the principle of producing micro-beads comprising thermoplastic micro-particles of the present invention.

Examples of the embodiment of the present invention are described below based on the figures. FIG. 1 shows an example of a conceptual diagram of the manufacturing principle for ultrafine filaments comprising thermoplastic polymer according to the present invention, and a perspective view of a device is shown. An original filament 1 comprising thermoplastic polymer is released from a reel 2 on which it is wound and is rolled out at a constant speed using roll out nip rollers (not shown in FIG. 1). Although the roll out nip rollers is omitted from the figure, the roll out rollers may be substituted by rotating the reel 2 at a constant rotary speed. The rolled out original filament 1 is led to an orifice 3. The entire original filament from the reel 2 to the orifice 3 remains in an original filament supply chamber 4, and the pressure is maintained at P1. The pressure P1 is maintained at a constant level using a valve 5 and a pressurizing pump (not shown in FIG. 1). The section after the orifice 3 exit is a spray chamber 6 under P2 pressure (a negative pressure in FIG. 1). The pressure P2 is maintained at a constant level using a valve 7 and a vacuum pump (not shown in FIG. 1). The original filament exiting from the orifice 3 is led into a spray chamber 6 along with the high speed air flow generated by the pressure differential between the original filament supply chamber 4 and the spray chamber 6. The original filament 1 is irradiated immediately below the orifice 3 using a laser beam 9 released by a carbon dioxide gas laser oscillation device 8. Now, in order to guide a laser beam 9 into the spray chamber 6, the laser beam must pass through a Zn—Se window 10a. Now, the laser beam 9 exits the Zn—Se window 10b that corresponds to a section of the spray chamber 6 wall and reaches a power meter 11. The original filament that has been heated and melted by the laser beam 9 is sprayed in the form of mist using the high speed air generated by the pressure difference between P1 and P2 and descends in the form of a sprayed micro-particle group 12. Micro-particles accumulation chamber 13 are a space under P2 pressure connected to the spray chamber 6 and is located on the bottom of the spray chamber 6. A micro-particle collection vessel 14 is present inside the micro-particle accumulation chamber 13, and the sprayed micro-particles 12 are collected in the collection vessel 14. The degrees of pressurization and vacuum are adjusted using valves 5 and 7 and a bypass valve and the like.

Figure 2:
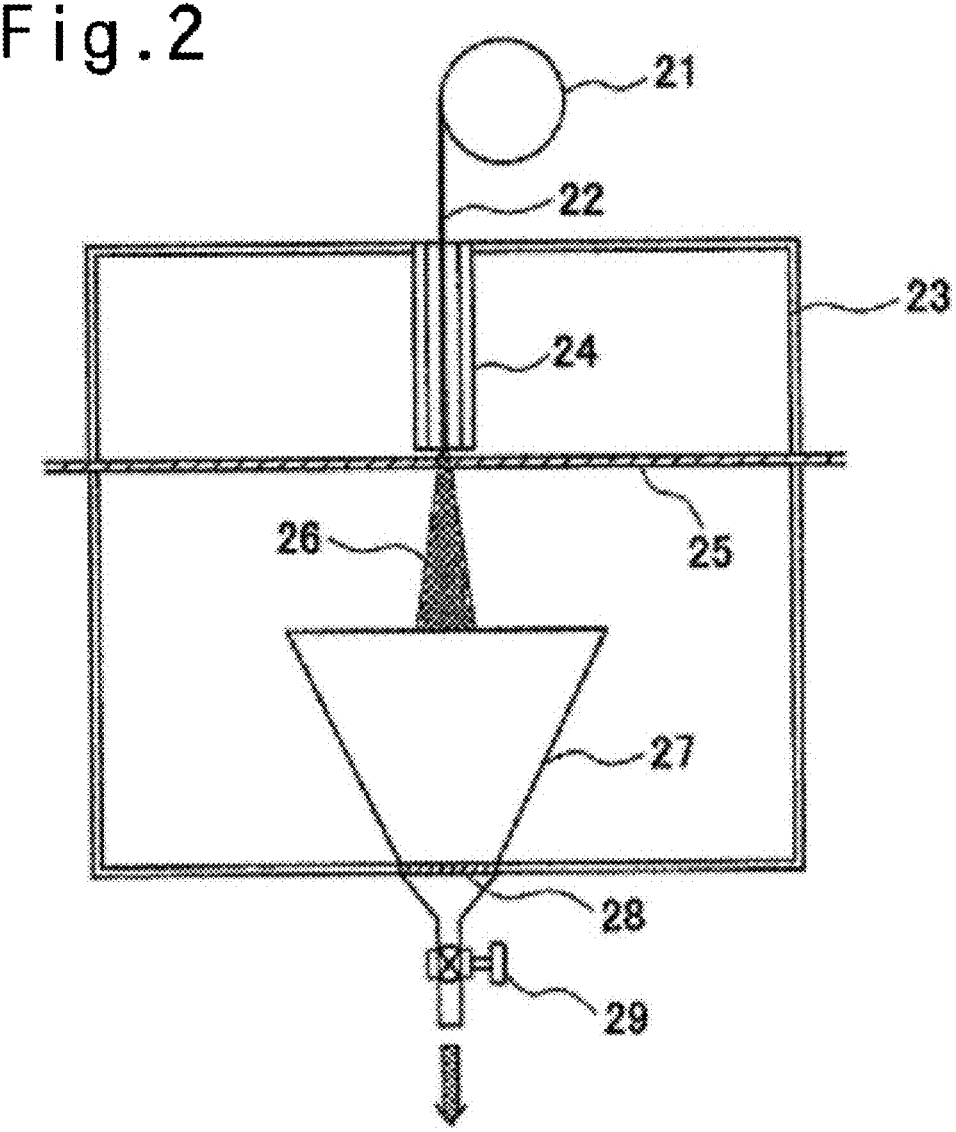
FIG. 2 The figure is a conceptual diagram showing an example wherein micro-beads manufacturing means of the present invention contain a filter.

FIG. 2 shows an example of a conceptual diagram of the micro-beads manufacturing means of the present invention containing a filter. The original filament 22 wound on a reel 21 is rolled out and is led into a spray chamber 23 under P2 pressure that is a negative pressure through an orifice 24. The original filament 22 that passed through the orifice 24 is heated using an infrared beam 25 and is sprayed using the gas flow passing through the orifice 24 to form micro-particles 26. The micro-particles 26 are guided into a collection vessel 27. A filter 28 is installed on the bottom of the collection vessel 27, and the negative pressure inside the spray chamber 23 is maintained constant using a vacuum pump (not shown in FIG. 2) through a valve 29 in a pipe connecting to the filter 28.

Figure 3:
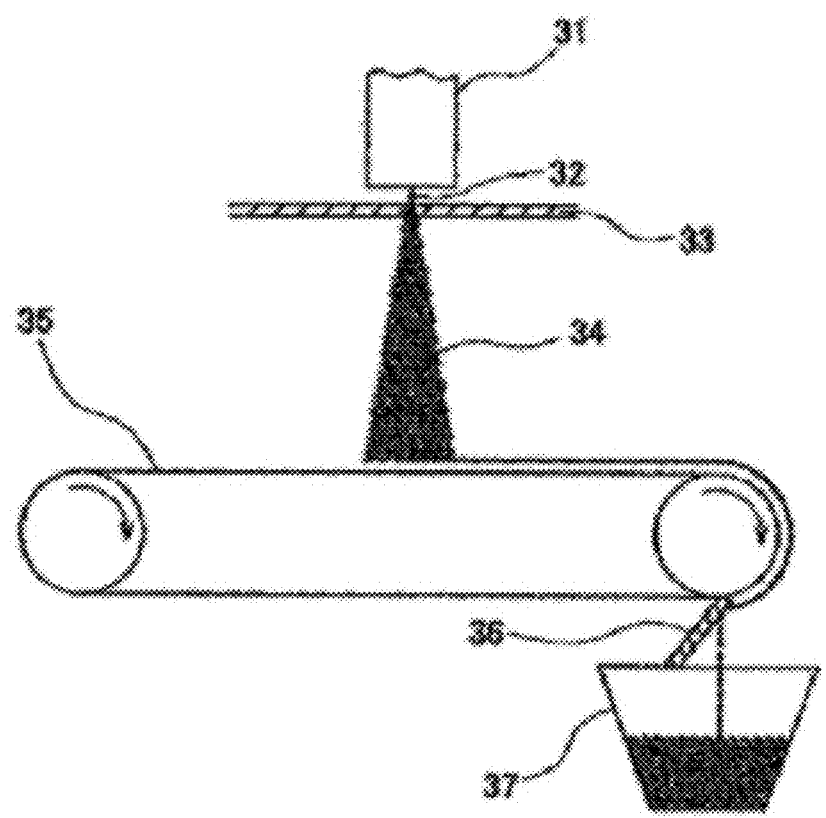
FIG. 3 The figure is a conceptual diagram showing an example wherein micro-beads manufacturing means of the present invention contain a scraper for collection.

FIG. 3 shows an example of a conceptual diagram of a micro-beads manufacturing apparatus with a scraper for collection. The original filament 32 discharged from the orifice 31 becomes sprayed micro-particles 34 using the gas flow from an orifice 31 and the heat from an infrared beam 33. The micro-particles 34 are sometimes accompanied by the drawn filaments produced as a byproduct. The sprayed micro-particles accumulate on a conveyer 35 circulating inside a spray chamber (not shown in FIG. 3 but is positioned below the orifice 31). A scraper 36 is used to remove the micro-particles and collect them inside a collection vessel 37.

Figure 4:
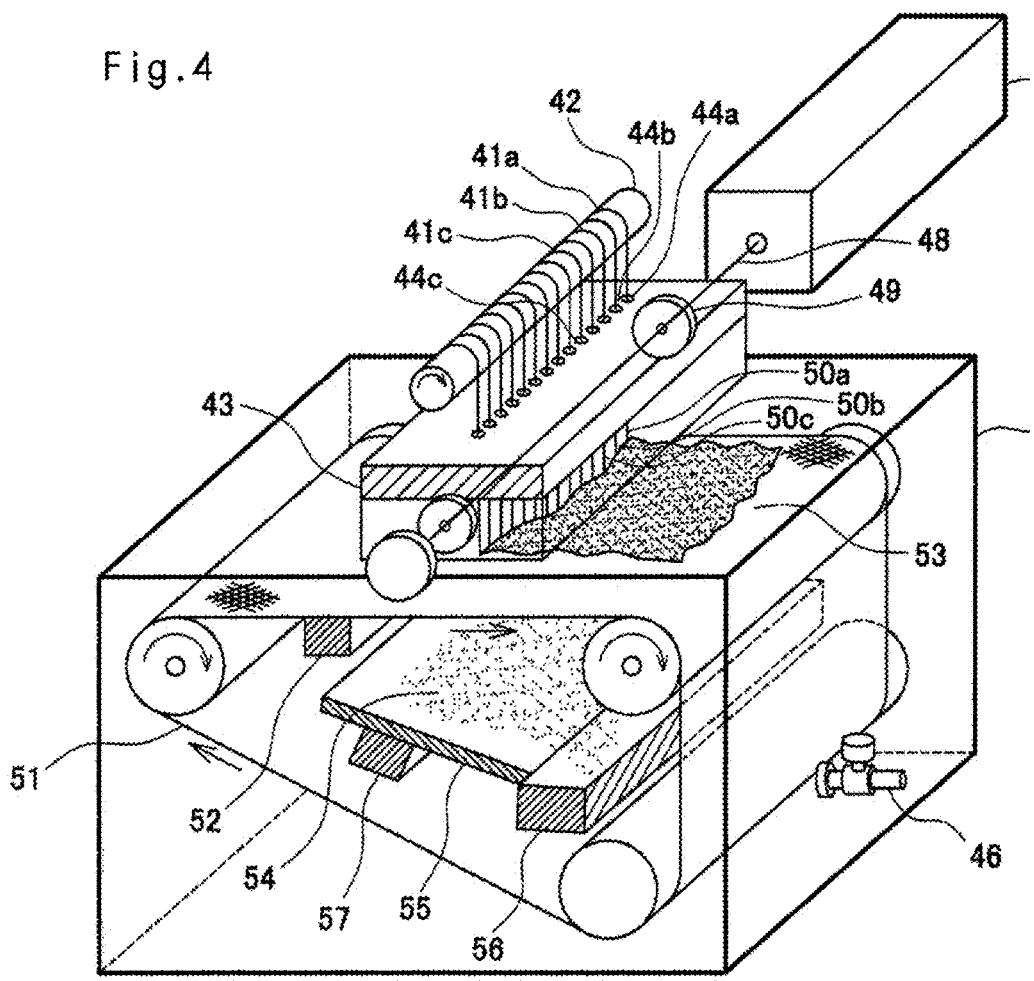
FIG. 4 The figure is a conceptual diagram showing an example wherein micro-beads manufacturing means of the present invention contain a conveyer comprising a filter.

FIG. 4 shows the conceptual diagram of a micro-beads manufacturing apparatus with a conveyer comprising a filter and show its perspective view. The original filaments 41a, 41b, 41c, . . . comprising thermoplastic polymer are rolled out from a reel 42 and are transferred at a constant speed through a comb and the like (not shown in the figure) using roll out nip rollers (not shown in FIG. 4) and the like. Multiple orifices 44a, 44b, 44c, . . . are carved (or drilled) in a plate 43, and the original filament 41 comprising a thermoplastic polymer transferred is led to the orifice 44. The steps up to this point in the figure are shown in the figure to illustrate a case in which the pressure P1 in an original filament supply chamber is maintained at atmospheric pressure and no special chamber is needed. The area after the exit from the orifices 44a, 44b, 44c, . . . becomes a spray chamber 45 under pressure P2 (negative pressure in this figure shown). The pressure P2 is maintained at a constant level using a valve 46 from a vacuum pump (not shown in FIG. 4). The original filaments 41a, 41b, 41c, . . . exiting from the orifices 44a, 44b, 44c, . . . are led to a spray chamber 45 along with the high speed air generated by the pressure difference between the original filament supply chamber and the spray chamber. A laser beam 48 discharged (or emitted) from a carbon dioxide gas laser oscillation device 47 irradiates multiple original filaments 41 directly under the orifice 44. Now, the laser beam 48 passes through a window 49 comprising Zn—Se in order to guide the beam into the spray chamber 45. The original filament 41 is heated and melted by the laser beam 49, sprayed using the high speed air generated by the pressure difference between P1 and P2 and descends in the form of a sprayed material 50*a*, 50*b*, 50*c*, . . . comprising micro-particles grouping and drawn filaments formed as a byproduct. A conveyer 51 comprising a filter is circulating in the lower section of the spray chamber 45, and the sprayed material 50 accumulates on the conveyer 51. A vibrator 52 is installed on the conveyer 51, and the vibrator 52 functions to allow the micro-particle grouping 54 to fall off from the sprayed material 50 on the conveyer 51 made of a filter leaving a web 53 comprising the drawn filaments to remain on the conveyer 51. The micro-particle grouping 54 that fell off is received by a sloped collection plate 55 and accumulates inside a collection box 56 after falling along the slope. In order to smoothly transfer the micro-particle grouping 54 from the collection plate 55 to the collection box 56, the installation of a vibrator 57 also on the collection plate is desirable. In addition, the micro-particle grouping 54 on the collection plate 55 may also be heat treated using an infrared heating and the like. Now the web 53 on the conveyer 31 is rolled up by a web rolling device (not shown in FIG. 4) and is continuously removed from the conveyer 51.

Figure 5:
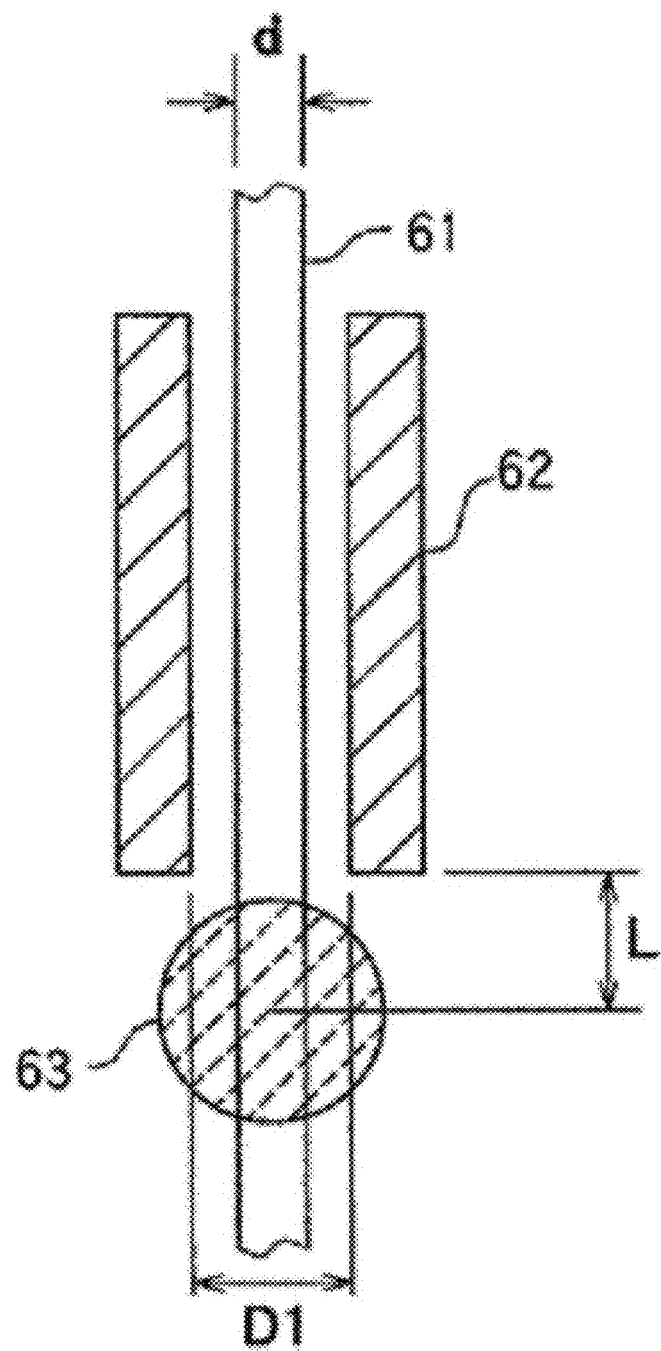
FIG. 5 The figure is a conceptual diagram showing an example of the orifice in the present invention.

FIG. 5 shows a cross sectional diagram of an orifice that is an example of one orifice mode in the present invention. FIG. 5 shows a simple cylindrical orifice 62 through which an original filament 61 with the filament diameter (d) passes through. The internal orifice diameter in the exit section is D1. The original filament 61 exiting the orifice 62 is irradiated with an infrared light beam 63. Then the orifice exit is positioned to minimize the distance (L) to the infrared light beam 63 center as much as possible.

Figure 6:
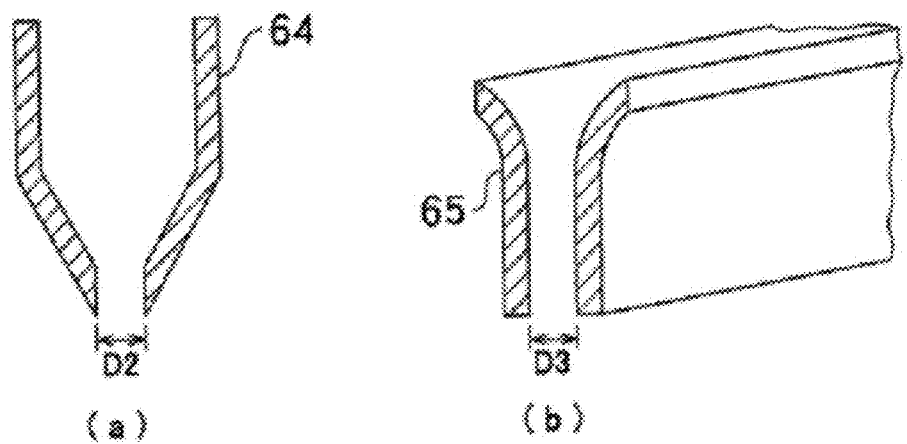
FIG. 6 The figure is a conceptual diagram showing another example of the orifice in the present invention.

FIG. 6 shows an orifice cross sectional diagram of another orifice mode. Figure (a) shows one type of orifice 64 with a large entrance section and a thinner exit section with the internal diameter (D2). Figure (b) is a conceptual diagram showing a partial cross section of an orifice 65 through which multiple filaments are simultaneously discharged. The exit diameter (D3) in Figure (b) is shown using the narrowest direction and the diameter in the thickness direction.

Figure 7:
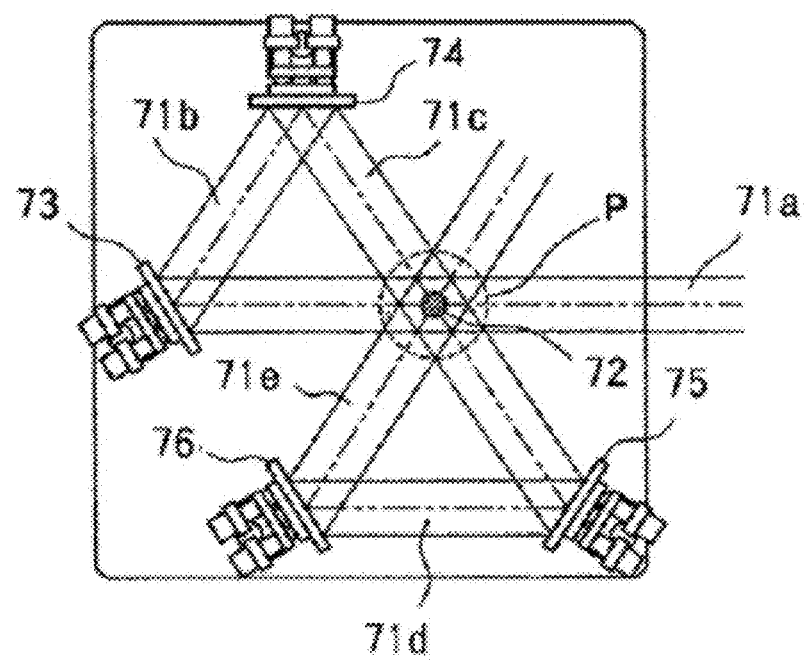
FIG. 7 The figure is a conceptual diagram showing an example in which an original filament is irradiated at multiple locations using mirrors to reflect an infrared beam in the present invention.
Figure 7:
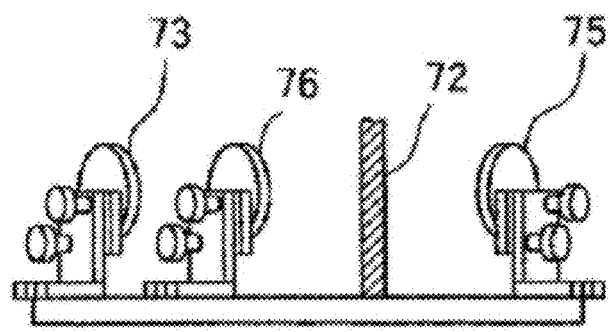

FIG. 7 shows an example of a means used to irradiate an original filament from multiple locations using an infrared light beam in the present invention. Figure A is a front view and Figure B is a side view. The infrared light beam 71a emitted from an infrared light beam irradiation device reaches a mirror 73 after passing a zone P (inside the dotted line in FIG. 7) through which an original filament 72 passes to become an infrared light beam 71b reflected by the mirror 73. The light beam becomes an infrared light beam 71c upon reflection on a mirror 74. The infrared light beam 71c moves through the zone (P) and irradiates the original filament 72 at one hundred twenty degrees later from the initial original filament irradiation position. The infrared light beam 71c that passes through the zone (P) is reflected by a mirror 75 to become an infrared light beam 71d and is reflected by a mirror 76 to become an infrared light beam 71e. The infrared light beam 71e passes through the zone (P) and irradiates the original filament 72 at an opposite one hundred twenty degrees later from the infrared light beam 71c in the initial original filament irradiation location. The original filament 72 can be heated evenly from symmetrical one hundred twenty degrees away from each other using three infrared light beams 71a, 71c, 71e in the manner described.

Figure 8:
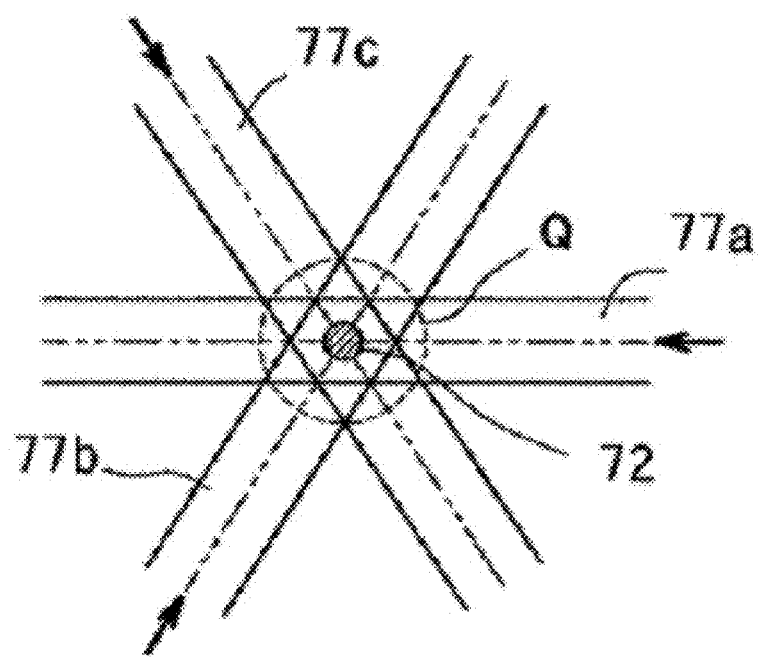
FIG. 8 The figure is a conceptual diagram showing an example in which multiple infrared beam radiating devices are positioned to irradiate an original filament from multiple locations in the present invention.

FIG. 8 shows another example of the original filament irradiation means wherein the original filament is irradiated from multiple locations using infrared light beams used in the present invention, and an example in which multiple light source is used is shown using a front view. The infrared light beam 77a emitted from an infrared irradiation device is used to irradiate an original filament 72. In addition, the original filament 72 is also irradiated with an infrared light beam 77b emitted from a different infrared irradiation device. Furthermore, the original filament 75 is irradiated using an infrared light beam 77c irradiated from yet another infrared irradiation device. In the manner described, radiation from multiple light sources can provide a high power light source by using multiple stable and inexpensive laser emitting devices as a high powered light source. Now three light sources are shown in the figure, but two may also be used and four or more may also be used. A multifilament comprising multiple original filaments is sprayed effectively using such multiple light sources.

Example 1

Figure 9:
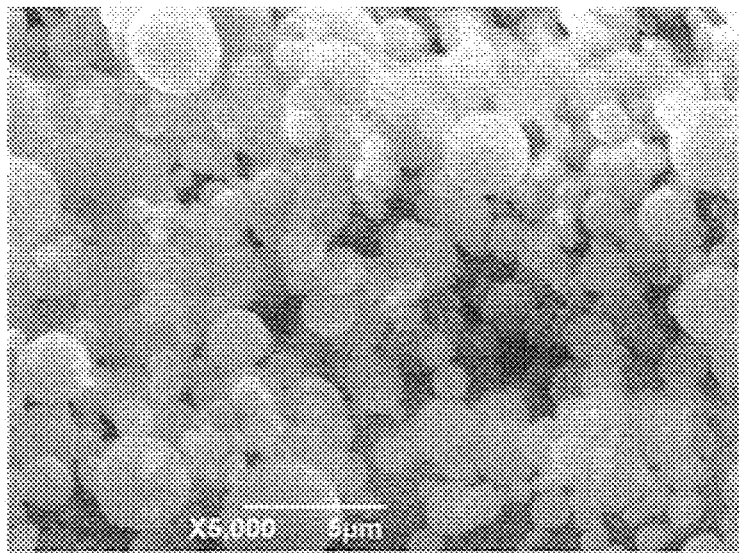
FIG. 9 The figure is an electron microscope photograph (magnification 5,000) of poly(ethylene terephthalate) micro-beads formed according to the present invention.
Figure 10:
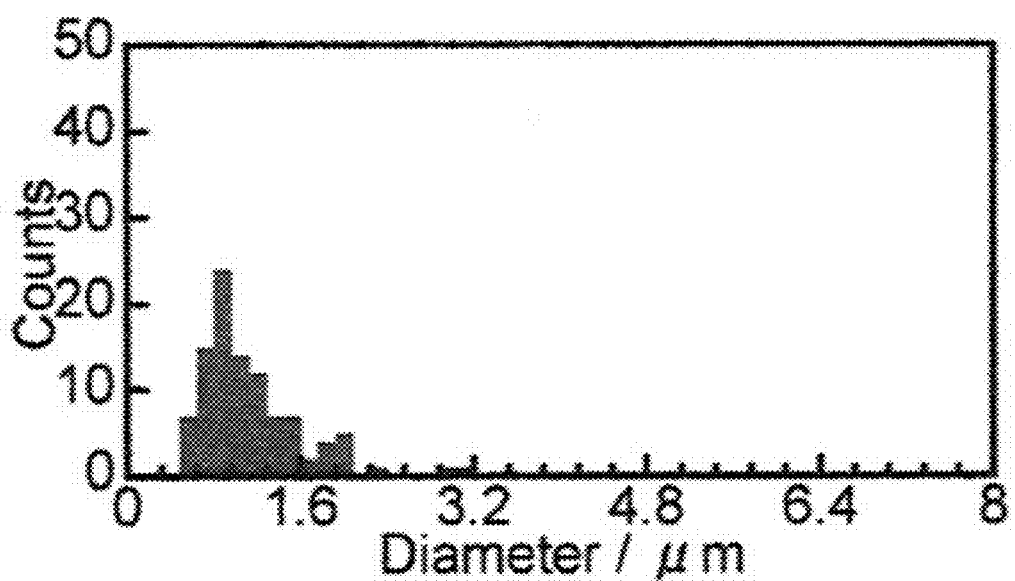
FIG. 10 The figure is a histogram showing the particle size distribution of poly(ethylene terephthalate) micro-beads formed according to the present invention.

An undrawn (or as-spun) polyethylene terephthalate (PET) filament (filament diameter: 110 μm, a degree of crystallinity: 7%) was used as the original filament, and a degree of crystallinity became 41% after a ten minute heat treatment at 260° C. The heat treated PET original filament was used, and micro-beads spraying were conducted using the spraying device in FIG. 1. The annealed filament was heated by the laser irradiation at a laser output power of 20 W, and its beam diameter (light beam) was 1.8 mm. The orifice shown in FIG. 6(a) was used as the orifice, and the orifice diameter (d2) was 0.5 mm. The degree of vacuum (or chamber pressure) in the spray chamber was adjusted so that (P1) was atmospheric pressure and (P2) was 16 kPa. When the original filament was supplied at a rate of 0.1 m/min, micro-beads with even particle size and high sphericity shown in the FIG. 9 SEM photograph (magnification 5,000) were formed. The particle size distribution at this point concentrated in the area of from 0.8 μm to 1.2 μm as shown in FIG. 10, and a narrow distribution width was observed. The average particle size was 0.9 μm at this point and qualified as nano particles. Now, micro-beads were little or not obtained and nano filaments were obtained when the original filament prior to the heat treatment with a degree of crystallization of 7% was used without additional treatments.

Example 2

Figure 11:
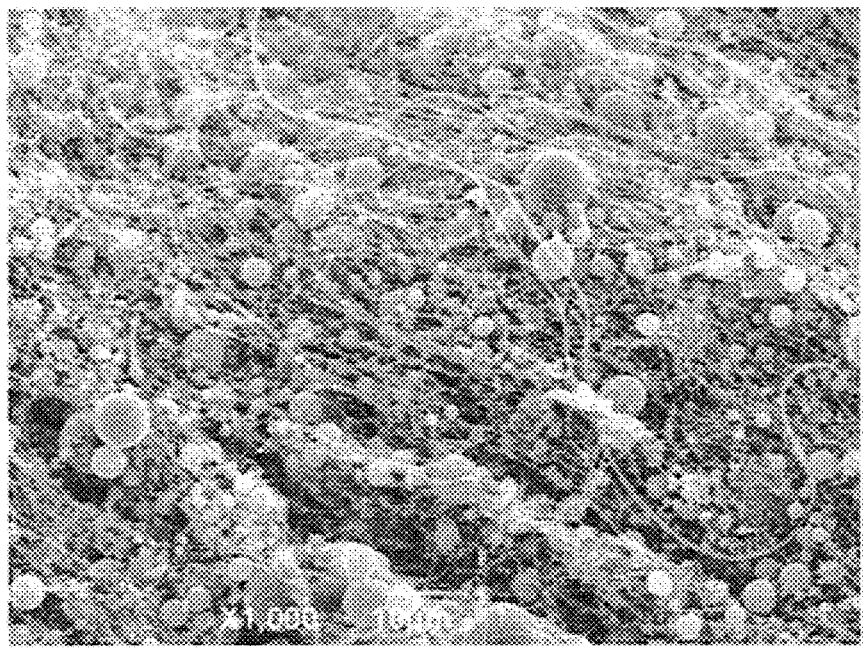
FIG. 11 The figure is an electron microscope photograph (magnification 1,000) of poly(L-lactic acid) (PLLA) micro-beads formed according to the present invention.

A poly-L-lactic acid (PLLA) drawn filament (filament diameter 75 μm) was used as the original filament, and a degree of crystallinity became 60% after a 10 minute heat treatment at 160° C. The heat treated PLLA original filament was used, and micro-beads spraying were conducted using the spraying device in FIG. 4. The annealed filament was heated by the laser irradiation at a laser output power of 20 W, and its beam diameter was 1.8 mm. The orifice shown in FIG. 6(a) was used as the orifice, and the orifice diameter (d2) was 0.5 mm. The degree of vacuum (or the chamber pressure) in the spray chamber was adjusted so that (P1) was atmospheric pressure and (P2) was 16 kPa. When the original filament was supplied at a rate of 0.1 m/min, micro-beads with only a slight amount of drawn filament in the FIG. 11 SEM photograph (magnification 1,000) were formed. The drawn filament was filtered using a 30 mesh filter, and the average particle size of the micro-beads upon filtration was 0.76 μm.

Example 3

Figure 12:
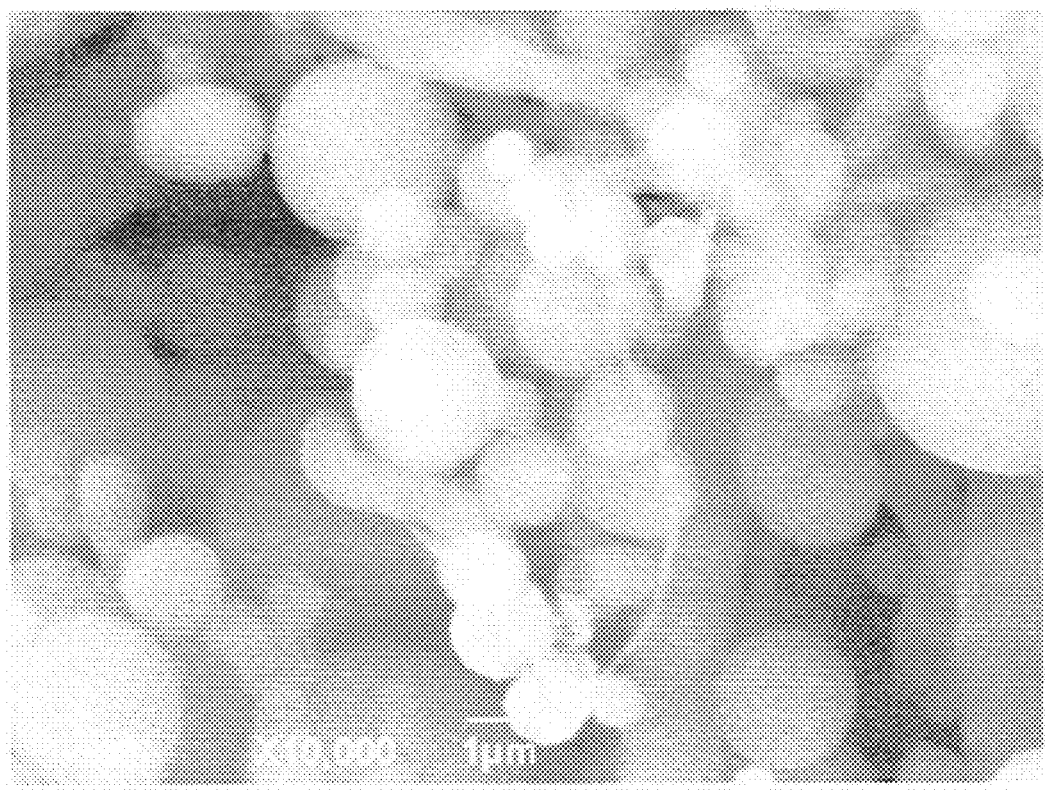
FIG. 12 The figure is an electron microscope photograph (magnification 10,000) of high density polyethylene micro-beads formed according to the present invention.

A high density polyethylene (MFR:1.0, a degree of crystallinity: 60%) drawn filament (filament diameter:176 μm) was used as the original filament, and the drawing (spraying?) device shown in FIG. 1 was used to spray micro-beads. The filament was heated by the laser irradiation at a laser output power of 20 W, and the beam diameter was 1.8 mm. The orifice shown in FIG. 6(a) was used as the orifice, and the orifice diameter (d2) was 0.5 mm. The degree of vacuum in the spray chamber was adjusted so that (P1) was atmospheric pressure and (P2) was 16 kPa. When the original filament was supplied at a rate of 0.1 m/min, micro-beads with high sphericity and even particle size shown in the FIG. 12 SEM photograph (magnification 10,000) were formed.

Example 4

Figure 13:
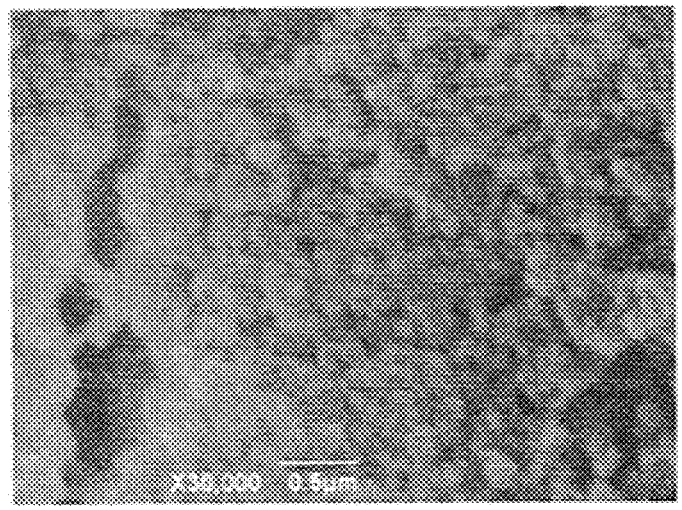
FIG. 13 The figure is an electron microscope photograph (magnification 30,000) of PFA (tetrafluoroethylene perfluoroalkyl vinyl ether) copolymer micro-beads formed according to the present invention.

An undrawn tetrafluoroethylene·perfluoroalkyl vinyl ether copolymer (PFA) filament (filament diameter: 100 μm, a degree of crystallinity: 27%) was used as the original filament, and the spraying device shown in FIG. 1 was used to spray micro-beads. The degree of vacuum in the spraying chamber was adjusted to atmospheric pressure (P1) and (P2) 94 kPa. When the original filament was supplied at a rate of 0.1 m/min, micro-beads with high sphericity and even particle size shown in the FIG. 13 SEM photograph (magnification 30,000) were formed. The average particle size at this point was 50 nm, and the particles classified as nano particles.

INDUSTRIAL APPLICABILITY

Polymer micro-particles have been used in the recent years to modify polymers, as additives to cosmetic and pharmaceutical products, as rheology modification agents for paint and the like since the particle size was small, the surface area was very large and they dispersed well in other substances. They particularly attracted attention as resin molding technology starting materials in rapid prototyping and the like where they were combined with laser processing technology to manufacture custom made molded products.

DESCRIPTION OF THE SYMBOLS

1: Original filament comprising thermoplastic polymer.
2: Reel.
3: Orifice.
4: Original filament supply chamber.
5: Valve.
6: Spray chamber.
7: Valve.
8: Carbon dioxide gas laser oscillation device.
9: Laser beam.
10a, 10b: Zn—Se windows.
11: Power meter.
12: Micro-particles grouping.
13: Micro-particles accumulation chamber.
14: Collection vessel.
21: Reel.
22: Original filament.
23: Spraying chamber.
24: Orifice.
25: Infrared beam.
26: Micro-particles
27: Collection vessel.
28: Filter.
29: Valve.
31: Orifice.
32: Original filament.
33: Infrared beam.
34: Micro-particles.
35: Conveyer.
36: Scraper.
37: Collection vessel.
41a, 41b, 41c: Original filament.
42: Reel.
43: Plate.
44a, 44b, 44c . . . : Orifice.
45: Spraying chamber.
46: Valve.
47: Carbon dioxide gas laser oscillation device.
48: Laser beam.
49: Zn—Se window.
50a, 50b, 50c . . . : Sprayed material.
51: Conveyer.
52: Vibrator.
53: Web.
54: Micro-particle grouping.
55: Collection plate.
56: Collection box.
57: Vibrator.
61: Original filament.
62: Orifice.
63: Infrared light beam.
64, 65: Orifice.
71a, 71b, 71c . . . : Infrared light beam.
72: Original filament.
73, 74, 75, 76: Mirrors.
77a, 77b, 77c . . . : Infrared light beam.

What is claimed is:

1. A method of manufacturing micro-beads comprising thermoplastic micro-particles with an average particle size of 10 μm or smaller, the method comprising:
    transferring an original filament comprising a thermoplastic polymer under a pressure P1
    through an orifice and into a spray chamber under a pressure P2, wherein P1>P2;
    irradiating the original filament that passed through the orifice in the spray chamber using an infrared beam; and
    spraying the melted filament into microparticles using a gas flow generated by the pressure differential between P1 and P2, wherein the micro-beads have an average particle size of less than 1 μm.

2. The method according to claim 1, wherein the original filament is heat treated while the original filament is introduced into the orifice.

3. A method of manufacturing micro-beads comprising thermoplastic micro-particles with an average particle size of 10 μm or smaller, the method comprising:
    transferring an original filament comprising a thermoplastic polymer under a pressure P1
    through an orifice and into a spray chamber under a pressure P2, wherein P1>P2;
    irradiating the original filament that passed through the orifice in the spray chamber using an infrared beam; and
    spraying the melted filament into microparticles using a gas flow generated by the pressure differential between P1 and P2, wherein the original filament has a degree of crystallization of at least 25% according to differential scanning calorimetric (DSC) measurements.

4. The method according to claim 1, wherein the microparticles and the drawn filament obtained as a byproduct along with the microparticles are accumulated on a filter inside a vacuum chamber.

5. The method according to claim 4, wherein the filter forms a conveyer that circulates the filter.

6. A method of manufacturing micro-beads comprising thermoplastic micro-particles with an average particle size of 10 μm or smaller, the method comprising:
    transferring an original filament comprising a thermoplastic polymer under a pressure P1
    through an orifice and into a spray chamber under a pressure P2, wherein P1>P2;
    irradiating the original filament that passed through the orifice in the spray chamber using an infrared beam; and
    spraying the melted filament into microparticles using a gas flow generated by the pressure differential between P1 and P2, wherein P1 is atmospheric pressure and P2 is reduced pressure.

7. The method to claim 1, wherein the infrared beam is a carbon dioxide laser beam.

8. The method according to claim 1, wherein the center of the infrared beam irradiates the original filament within 30 mm of the orifice exit.

9. The method according to claim 1, wherein the infrared beam irradiates the original filament center within 4 mm along a filament axis direction.

10. The method according to claim 1, comprising subjecting the micro-beads to a heat treatment at a temperature at or above a softening point of the micro-beads and yet at or below a melting point of the thermoplastic polymer.

* * * * *